United States Patent [19]

Duddy

[11] 3,955,786
[45] May 11, 1976

[54] MINIATURE MAGNETIC BASE FLAGSTAFF ASSEMBLY FOR VEHICLE BODIES

[76] Inventor: James J. Duddy, 514 N. Metcalf St., Lima, Ohio 45801

[22] Filed: Feb. 19, 1975

[21] Appl. No.: 551,124

[52] U.S. Cl.................................. 248/537; 248/539
[51] Int. Cl.².................................. A01K 97/10
[58] Field of Search............ 248/206 A, 38, 43, 44, 248/45, 46, 47, 48

[56] References Cited
UNITED STATES PATENTS

| 881,006 | 3/1908 | Kline.................................... 248/44 |
| 1,090,573 | 3/1914 | Shaner................................... 248/43 |
| 2,727,650 | 12/1955 | Moynihan et al................ 248/206 A |
| 2,964,812 | 12/1960 | Cook.............................. 248/206 A |
| 3,027,670 | 4/1962 | Kramer et al......................... 248/44 |
| 3,081,054 | 3/1963 | Westervelt............................. 248/44 |
| 3,134,978 | 5/1964 | Arvay.................................... 248/43 |
| 3,232,567 | 2/1966 | Mastenbrook......................... 248/44 |
| 3,450,378 | 6/1969 | Cucka.................................... 248/43 |
| 3,451,709 | 6/1969 | Swavger........................... 248/206 A |
| D162,583 | 3/1951 | Schmitman et al.............. 248/206 A |

*Primary Examiner*—Roy D. Frazier
*Assistant Examiner*—Robert A. Hafer
*Attorney, Agent, or Firm*—C. Hercus Just; Samuel M. Learned, Jr.

[57] ABSTRACT

A miniature magnetic base flagstaff for vehicle bodies comprised of a geometrically configured base plate member to which is affixed an upwardly extending flexible flagstaff appropriate for attachment thereto of a miniature flag of suitable type, and to the underside of the base plate member there is affixed a plurality of geometrically arranged elastomeric magnet members containing a dispersion therein of permanently magnetized ferrous particles which are secured to the underside of the base plate member. Said flagstaff assembly is particularly suitable for use in ceremonial vehicular convoys, such as funeral processions, wherein the vehicles comprising the convoy traditionally fly a miniature flag attached thereto which identifies each respective vehicle as being a unit of the convoy procession and the purpose therefor. The flagstaff assembly includes as additional feature, ease of attachability and detachability to and from an appropriate location on a vehicle body surface, such as a fender or top, with low-abrasive characteristics of the contact surface of the magnetic base members upon the vehicle body surface, thereby precluding scratching or marring of the finish on the vehicle surface where the flagstaff assembly is magnetically affixed thereto.

4 Claims, 8 Drawing Figures

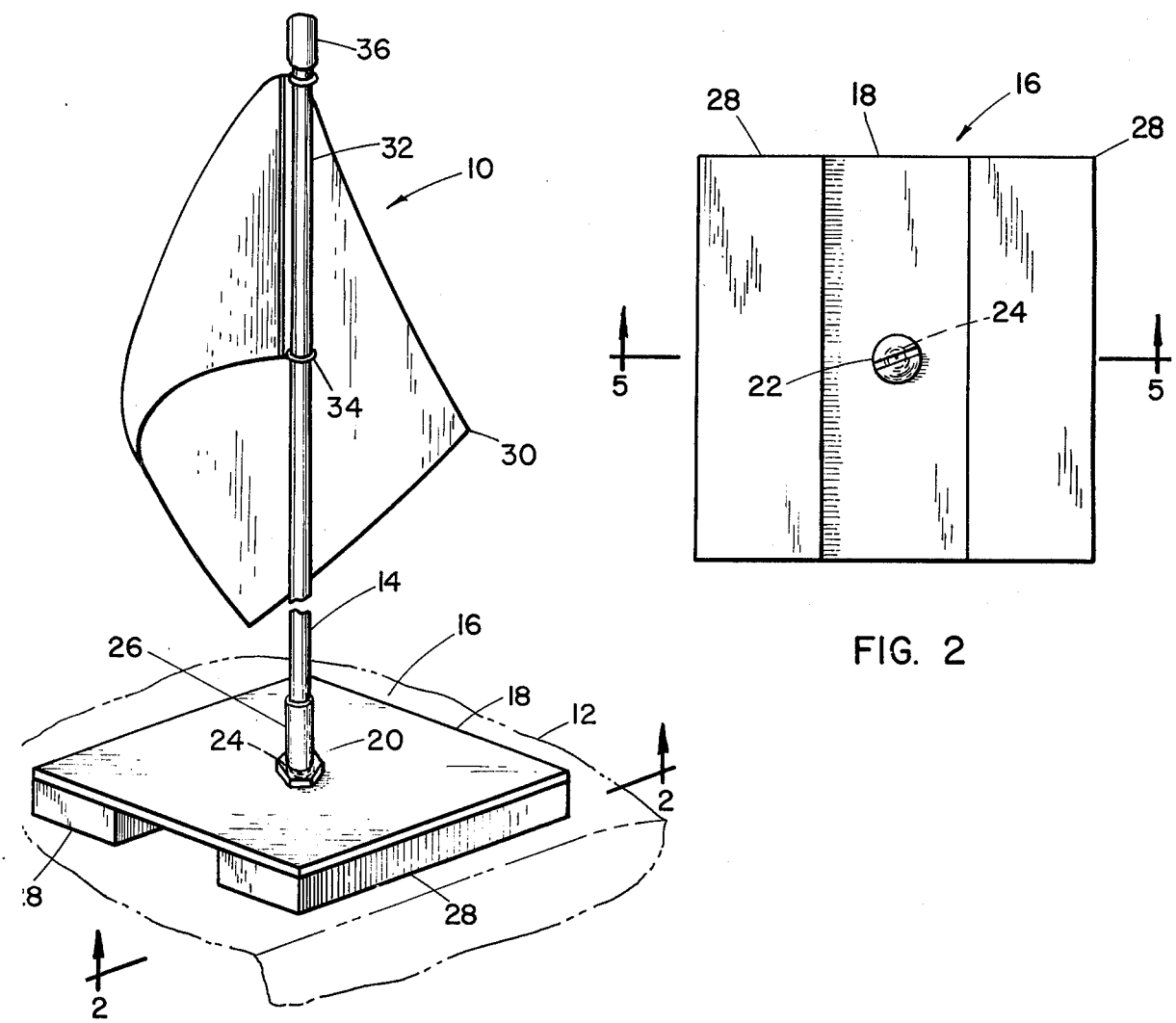
FIG. 1
FIG. 2
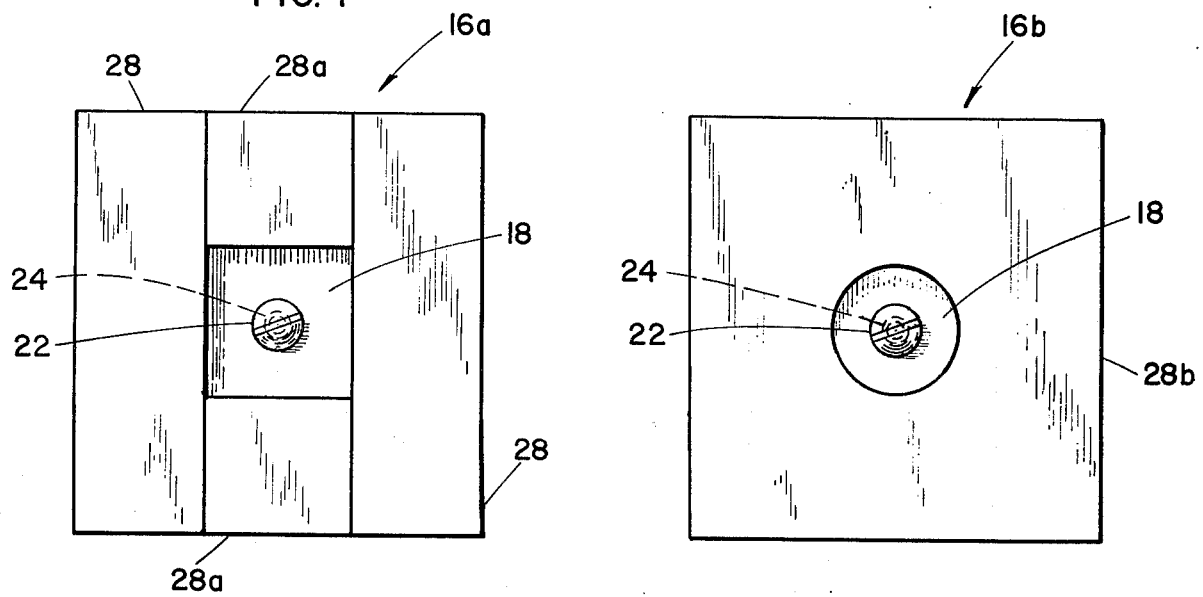
FIG. 3
FIG. 4

MINIATURE MAGNETIC BASE FLAGSTAFF ASSEMBLY FOR VEHICLE BODIES

BACKGROUND OF THE INVENTION

Flagstaff assemblies for vehicular mounting of miniature flags for various purposes, such as vehicular funeral processions and the like, have long been known, exemplified, for example, by miniature flagstaffs affixed to vehicle bodies by means of a flexible suction cup base member, as well as various solid metal type magnetic mounting means for miniature flagstaff and flag assemblies, in addition to the currently relatively popular custom of affixing miniature flags to vehicular radio aerials. However, among all of the aforementioned vehicular miniature flag mounting means none of the aforementioned means discloses advantages and features afforded by the details of the present invention described and claimed hereinafter. Particular consideration is directed to the miniature flagstaff assembly adapted to be attached to vehicles by magnetic base means.

Previously used solid metal type magnetic base flagstaff assemblies have employed relatively small solid metallic ferromagnetic attachment means which do not provide the degree of mounting support obtainable with the present invention, which incorporates a relatively broad-base magnetic attachment means. Further, solid metallic magnetic attachment means per se tend to scratch and mar the finish of support surfaces to which they are magnetically affixed as a consequence of the bare metal contact therewith, a problem also overcome by the composition, construction, and characteristics of the magnetic attachment means employed in the present invention. This feature of the present invention, by nature of the magnets employed, constitutes an improvement over such prior bare metallic magnetic mounting members even though they may be coated with a mar-resistant finish, which finish, with aging and wear, may chip and flake to reexpose the bare metal of the solid magnetic base attachment means, whereby scratching and marring thereafter occurs.

The present invention is distinguishable from earlier inventions in one or more ways in that the present invention has utility features and new and useful advantages and improvements not heretofore disclosed, as set forth below.

SUMMARY OF THE INVENTION

It is the principal object of the present invention to provide a miniature magnetic base flagstaff assembly for detachable attachment to ferromagnetic vehicle body surfaces, said assembly having a broad metallic base plate to which is affixed by cement or otherwise one or more geometrically configured and positioned permanent magnet elements having as a composition thereof a discrete dispersion of permanently magnetized ferrous particles within an elastomeric medium, wherein the total weight of the base member assists in supporting said assembly when placed upon a horizontal non-magnetic bearing surface, in addition to providing firm magnetic adherence to a generally flat ferromagnetic surface in any position of magnetic attachment.

It is another object to provide a modified miniature magnetic base flagstaff assembly for detachable attachment to non-flat ferromagnetic vehicle body surfaces, such as the curved outer edge portions of fenders and the like, wherein the base member is comprised of one or more base plate elements hingedly connected together, each of said base plate elements having affixed thereto at least one geometrically configured permanent magnet element of the type heretofore described, whereby said base member, by means of the hingedly connected structure thereof, may be conformed to the shape of the ferromagnetic surface to which it is magnetically adhered while at the same time supporting the flagstaff element affixed thereto in an essentially vertical position, or any desired alternate position.

It is a further object to provide a miniature magnetic base flagstaff assembly which has attachment contact surfaces that are sufficiently non-abrasive so as to preclude within reasonable limits the danger of either marring or scratching the finish of a supporting ferromagnetic vehicular body surface to which said assembly may be magnetically adhered.

It is also an object of the present invention to provide a miniature magnetic base flagstaff assembly wherein the flagstaff member is comprised of a tough flexible synthetic resin rod vertically secured at one end to the base plate by means of a threaded bolt extending upward through a hole in the base plate and extending threadably and partially into a short sleeve of elastomeric material, the upper end of which forms a socket into which the lower end of the flagstaff extends frictionally and thereby effectively supports the flagstaff against abnormal bending.

Another object of the present invention is to provide magnetic base elements which comprise broad magnetic contact surfaces on the base member to stabilize the base member against the possibility of lateral forces exerted against the flagstaff from dislodging the base member from the surface supporting the same during normal use.

BRIEF DESCRIPTION OF THE DRAWINGS

FIG. 1 is a perspective elevation of a miniature magnetic base flagstaff assembly embodying the principles of the present invention, shown in an exemplary position upon a fragmentary vehicle body surface, with the flagstaff member of said assembly being foreshortened in order to accommodate the view to the sheet.

FIG. 2 is a bottom view of the base assembly shown in FIG. 1, as seen along the line 2—2 thereof.

FIG. 3 is a bottom view of another embodiment of a base member assembly different from that shown in FIGS. 1 and 2.

FIG. 4 is a bottom view of yet another embodiment of a base member assembly different from those heretofore shown in FIGS. 1–3.

DETAILED DESCRIPTION OF THE INVENTION

Figure 5:
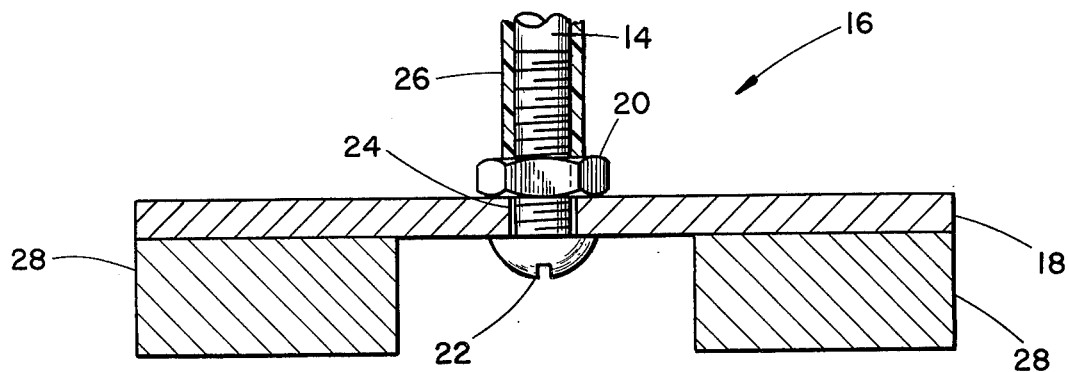
FIG. 5 is an enlarged fragmentary cross-sectional view revealing details of the embodiment of the base member assembly shown in FIG. 2, as seen on the line 5—5 thereof.

Referring to FIG. 1, a miniature magnetic base flagstaff assembly 10 is shown supported upon a fragmentary exemplary ferromagnetic support surface member of a vehicle body 12, such as the fender, hood or roof of said vehicle.

Referring again to FIG. 1, to explain in more detail the construction of this invention, as well as the preferred method of use of the same, it contemplates providing a relatively light weight flexible flagstaff 14 vertically affixed to a relatively broad base member 16 by means of clamping the base plate 18 of said base member 16 to flagstaff 14 by means of a nut 20 threaded upon one end of a bolt or screw 22 which extends through a substantially centrally located circular opening 24 in base plate 18. Bolt 22 extends a suitable distance above plate 18 to comprise a stud onto which a short length of elastomeric tubing 26 is threaded for secure attachment thereto. The upper end of said tubing forms a socket into which the lower end of staff 14 is fitted frictionally against ready removal. Tubing 26 may be of synthetic resin, rubber compound, or otherwise and permits limited flexibility.

Base member 16, for illustrative purposes, is shown as being square in shape, the dimensions of which are on the order of 3 to 4 inches along a side but such dimensions are illustrative and not restrictive. Also, base member 16 could have the configuration of any convenient geometric shape such as a circle, hexagon, or other polygonal shape, which would also, however, have a surface area of contact for magnetic adherence and support approximating that of said base member 16 as illustrated and described. Further, as heretofore indicated, said base member 16 is comprised of a base plate 18 in addition to a plurality of geometrically shaped elastomeric magnet members 28 which are secured to said base plate 18, preferably by cement, such as rubber base contact cement. Base palte 18 also provides the attachment means for connection of the flagstaff 14 thereto, as heretofore described.

Through the employment of elastomeric magnet members 28 as the magnetic elements of said base member 16 assembly, which magnets are composed of a dispersion of permanently magnetized particles within an elastomeric medium such as a flexible and/or compressible resin or the like, there is provided a sufficient degree of magnetic adherent force to attract the same magnetically to a ferromagnetic surface member of a vehicle body 12 so that the flagstaff 14 detachably affixed to base member 16, and the miniature flag 30 affixed to flagstaff 14, are adequately supported in the position of placement during movement of the vehicle at normal operational speeds within the normally allowable limits. Additionally, through the use of such elastomeric magnet members 28, there is no substantial possibility of scratching or marring the finish of a ferromagnetic vehicular supporting surface 12 to which said assembly 10 may be magnetically adhered. However, it should be understood that a non-abrasive coating of a suitable type, such as a rubber base type coating material, or cement, may also be applied to the contact surface of said elastomeric magnet members in order to further preclude any possibility of the same scratching or marring the finish on a ferromagnetic vehicular attachment surface.

The base plate 18 to which said elastomeric magnet members 28 are attached may be formed on a non-metallic material such as plastic or wood, or a light weight nonmagnetic metallic material such as aluminum. However, it is advantageous to construct said base plate 18 of some magnetic metallic material in that the inherent magnetic force of said elastomeric magnet members 28 thereby augments the cohesive bond of the cementitious material by which said elastomeric magnet members 28 preferably are attached to said base plate 18.

Attachment of said miniature flag 30 to flagstaff 14 is accomplished by means of a flagstaff retaining sleeve 32 integral with said flag 30, within which the upper section of flagstaff 14 is inserted to retain the flag in customary position upon said flagstaff 14 by means of a lower flagstaff collar member 34 of any suitable type, including an O-rings, and at the upper end of said flagstaff 14, a flexible compressive flagstaff tip member 36 is affixed. Flags may be replaced or changed simply by removing said tip member 36 and following the procedure described above. Miniature flags of different size may be reasonably accommodated by slidably adjusting the position of collar member 34 along the flagstaff 14.

The miniature flagstaff 14 preferably is formed from relatively stiff synthetic resin, such as "Nylon", which preferably has limited flexibility. However, it may be constructed of metal, wood, or any other suitable materials. The flagstaff under any circumstance should be sufficiently stiff to resist appreciable bending without breaking.

In FIG. 2 there is shown a bottom plan view of the base member 16 as seen along the line 2—2 of FIG. 1, and showing more clearly the geometric configuration of the elastomeric magnet members 28 attached to the base plate 18. Preferably they are respectively rectangular. Also shown is the head of bolt 22 which abuts against the lower surface of plate 18. From FIG. 2, it will be seen that by placing magnet members 28 along the edges of base plate 18, the magnetic forces are widely distributed with relatively minimum sizes of magnet members, thereby effecting economy without sacrificing adequate magnetic force.

The views seen in FIGS. 3 and 4 are similar to that seen in FIG. 2, excepting, however, respectively showing modified elastomeric magnet member configurations. FIG. 3 shows a base member 16a wherein the incorporation of additional short elastomeric magnet members 28a are shown affixed to said base plate 18 is spaced laterally abutting relationship to elastomeric magnet members 28. Clamping nut 26 also is shown disposed in the central space provided by the magnet arrangement. FIG. 4 shows yet another base member 16b, to which a unitary elastomeric magnet member 28b is shown, coextensive in area therewith and having therein a centrally located circular opening to accommodate clamping nut 26 for engagement with the threaded extension 22 of flagstaff 14, as heretofore described.

In all embodiments of the base member 16, the principal object is to position the magnet members 28 along the edges of the various embodiments of base plates 18 so as to spread the magnetic force of the magnets over as wide an area as possible and especially the perimeter of the area so as to afford maximum attaching stability for the base plate to a supporting surface, with economy in magnet quantity, and render such base members 16 capable of resisting tilting tendencies created by the flag and flagstaff during normal use.

The view seen in FIG. 5 is an enlarged cross-sectional elevation along the line 5—5 of FIG. 2, showing in greater detail the attachment of flagstaff 14 to the base plate 18 of base member 16 by means of nut 20 which is threaded onto bolt 22 to firmly connect it to plate 18 and the threaded end of the bolt is threaded tightly into the lower end of elastomeric tubing 26. As shown, especially in FIGS. 6 and 7, the lower end is tightly fitted frictionally into the upper end of tubing 26. The inner diameter of tubing 26 is slightly smaller than the diamter of flagstaff 14 to insure firm connection therebetween. Also, the tubing 26 forms a highly effective socket for said flagstaff in view of the elastomeric nature which also affords limited flexibility but capable of resisting abnormal bending of flagstaff 14 relative to the baseplate 18.

Figure 6:
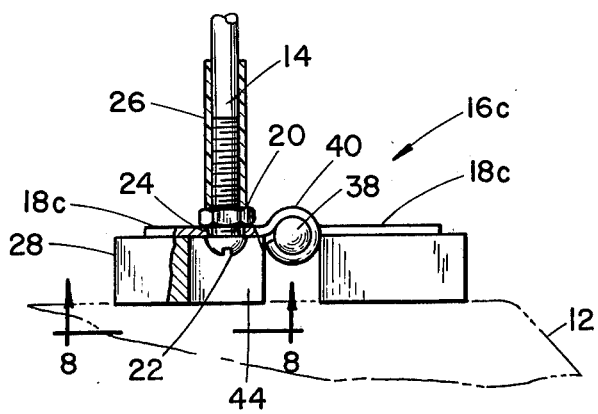
FIG. 6 shows a fragmentary side sectional elevation of a modified miniature magnetic base flagstaff assembly wherein the base magnetic members thereof are hingedly connected together.
Figure 7:
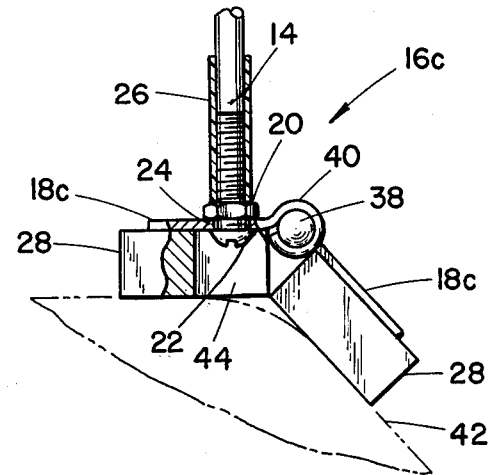
FIG. 7 is a fragmentary side sectional elevation of the assembly shown in FIG. 6, but shown magnetically affixed to curved ferromagnetic vehicular body surface.
Figure 8:
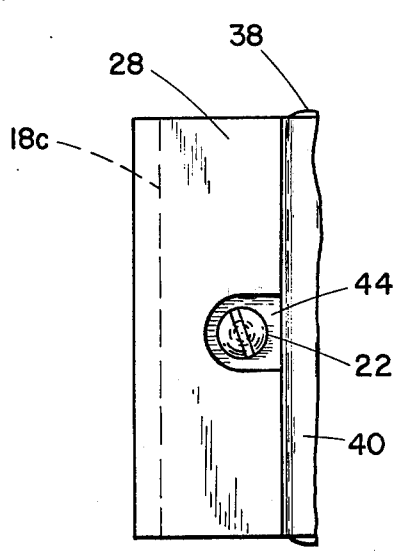
FIG. 8 is a plan view of one of the magnet members shown in FIG. 6, as seen along the line 8—8 thereof.

In FIG. 6, a fragmentary end elevation of a modified hingedly connected base member 16c is shown positioned upon a flat ferromagnetic support surface member of a vehicle body 12, such as the fender, roof or hood of such a vehicle as shown in FIG. 1. It will be noted that the modified base plate members 18c are hingedly connected to each other by means of a pintle 38 axially inserted through aligned intermeshing integral alternate knuckle elements 40 of the respective modified base plate members 18c. By means of the hinged connection, said modified base member 16c may be adapted to support the flagstaff 14 in a vertically erect configuration, whether the base member is magnetically affixed to a flat ferromagnetic vehicular support surface 12 as shown in FIG. 6, or a curved or angled ferromagnetic vehicular support surface 42, such as a fender or the like, as shown in FIG. 7. Therefore, the modified base member 16c provides a capability for adapting magnetic adherence of the miniature magnetic base flagstaff assembly 10 to other than flat ferromagnetic vehicular support surfaces such as that represented by the curved or angled surface 42. In this embodiment, one of the magnet members 28 is provided with a notch 44, see FIG. 8, to accommodate the extension 22 and clamping nut 26 shown in FIG. 6.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A miniature flagstaff assembly adapted to be detachably attached to an exterior surface of a ferromagnetic automobile body or a fender surface thereof for support thereby, said assembly comprising in combination, a planar base plate of predetermined geometric configuration to provide an appreciable area, a plurality of permanent bar-shaped magnet members of uniform thickness respectively connected in permanent adhesive affixment to one surface of said base plate in opposing parallel spaced relationship to each other respectively along opposite side edges of said base plate and substantially co-extensive in length therewith, a smooth circular centrally located opening formed in said base plate inwardly from all edges thereof, a threaded bolt extending perpendicularly upward through said opening from said one surface of said base plate and projecting substantially perpendicularly above the opposite planar surface of said base plate, a nut threaded downward onto said bolt in compressive communication with said opposite planar surface of said base plate to threadably secure said bolt in tight connection thereto and the outer end of said bolt being projective perpendicularly upward from said opposite planar surface of said base plate beyond said nut, a length of socket-forming tubing of limited flexibility having an inner tubular surface of uniform diameter throughout threaded part way at one end thereof onto said projecting end of said bolt and projecting perpendicularly upward from said opposite surface of said base plate and being in firm engagement with the upwardly disposed opposite side surface planar side of said nut, the other end of said tubing extending upward from the terminal end of said bolt to comprise a socket with the upwardly disposed terminal end of said bolt forming a base for said socket, a staff having limited flexibility and small diameter and having one end thereof tightly and frictionally fitting into said socket formed by said tubing so that the downwardly disposed terminal end of said staff is in close communication with said upwardly disposed terminal end of said bolt, the thickness of said magnets being at least as great as the depth of the head of the bolt clamped against said one surface of said base plate, and said magnets being formed from a non-abrasive elastomeric material of a pliable nature in which a mass of discrete permanently magnetized iron particles are uniformly distributed throughout said material to render the same magnetically attachable to a ferromagnetic automobile body or a fender surface thereof without scratching the finish thereon and thereby supporting said staff vertically upright of said automobile body or fender surface in stable manner and also permitting ready detachability of said flagstaff assembly therefrom.

2. The flagstaff assembly according to claim 1, wherein said base plate is comprised of a plurality of hingedly connected plate-like members with magnets respectively affixed to each of said members, and said socket forming tubing and bolt being connected to one base member adjacent the hinge connection between said plate-like members to permit said flagstaff to be disposed substantially vertical to the horizontal when said hingedly connected base plate is magnetically adhered to a curved exterior ferromagnetic surface of an automobile body or a fender with said one base member being arranged substantially horizontally.

3. The flagstaff assembly according to claim 1, wherein said magnetic base members are cementitiously affixed to said base plate by means of a mutually adhering coat of cement, a coating of non-abrasive material also being applied to the exterior contact surfaces of said magnetic base members to further facilitate the prevention of scratching and marring of the exterior finish upon a ferromagnetic automobile body or a fender affixment surface.

4. The flagstaff assembly according to claim 1 in which said length of tubing has an inner diameter slightly smaller than the outer diameter of said flagstaff and threaded bolt, said tubing being of an elastomeric nature and thereby permitting reception of the threads of said bolt into the inner surface of said tubing adjacent one end thereof, and said one end of said staff slightly stretching the outer end portion of said tubing when inserted into said outer end portion thereof to effect firm but removable mounting of said staff upon said base plate.

* * * * *